United States Patent [19]

Boot et al.

[11] Patent Number: 4,482,576

[45] Date of Patent: Nov. 13, 1984

[54] METHOD FOR TREATING AN EDIBLE OIL BY ISOTHERMAL DIRECTED INTERESTERIFICATION

[75] Inventors: Jacobus Boot, VZ Vlaardingen; Adrianus Rozendaal, BA Vlaardingen; Robert Schijf, NL Vlaardingen, all of Netherlands

[73] Assignee: Lever Brothers Company, New York, N.Y.

[21] Appl. No.: 355,292

[22] Filed: Mar. 8, 1982

[30] Foreign Application Priority Data

Mar. 11, 1981 [GB] United Kingdom ............... 8107657

[51] Int. Cl.$^3$ ........................... A23D 3/02; C11C 3/10
[52] U.S. Cl. ............................... 426/603; 260/410.7; 426/601; 426/606; 426/607
[58] Field of Search ............... 260/410.7; 426/601, 426/607, 603, 606

[56] References Cited

U.S. PATENT DOCUMENTS

| | | | |
|---|---|---|---|
| 2,442,531 | 6/1948 | Eckey | 260/410.7 |
| 2,442,532 | 6/1948 | Eckey | 426/607 |
| 2,442,535 | 6/1948 | Eckey | 260/410.7 |
| 2,442,538 | 6/1948 | Abbott | 260/409 |
| 2,875,066 | 2/1959 | Holman et al. | 99/122 |
| 3,748,348 | 7/1973 | Sreenivasan | 260/410.7 |
| 3,855,254 | 12/1974 | Haighton et al. | 426/601 |
| 3,859,447 | 1/1975 | Sreenivasan | 426/607 |
| 4,230,737 | 10/1980 | Heider et al. | 426/607 |
| 4,284,578 | 8/1981 | DeLathauwer et al. | 260/410.7 |
| 4,335,156 | 6/1982 | Kogan et al. | 260/410.7 |

FOREIGN PATENT DOCUMENTS

| | | |
|---|---|---|
| 0299374 | 4/1964 | European Pat. Off. . |
| 0009207 | 4/1980 | European Pat. Off. . |
| 1537238 | 8/1968 | France . |
| 1364682 | 8/1974 | United Kingdom . |
| 1381721 | 1/1975 | United Kingdom ............... 426/601 |

OTHER PUBLICATIONS

Eckey, "Directed Interesterification in Glycerides", Industrial & Engineering Chemistry, Jul., 1948, pp. 1183-1190.

"A Critical Study of Directed Arrangement of Fats", Industrie Chimique–Belge, T. 33, No. 6, 1968, pp. 553–557.

Primary Examiner—Thomas A. Waltz
Attorney, Agent, or Firm—Milton L. Honig; James J. Farrell

[57] ABSTRACT

A method for treating an edible oil rich in linoleic acids so as to increase its solid fat content comprises the directed interesterification under isothermal conditions of an oil containing at least 60% pufa and 12.5 to 16% safa. The method is simple to perform and produces an oil which can be employed directly in margarine manufacture. The oil can be a mixture of an oil high in pufa such as natural sunflower and safflower seed oil and an oil high in safa such as fully or partially hardened sunflower or safflower seed oil.

15 Claims, No Drawings

METHOD FOR TREATING AN EDIBLE OIL BY ISOTHERMAL DIRECTED INTERESTERIFICATION

The present invention relates to a method for treating an edible oil, to an oil so prepared and to margarine produced from the said oil.

An oil suitable for use in margarine manufacture is conventionally prepared from a mixture of triglycerides obtained from a vegetable, animal and/or a marine source by full or partial hydrogenation of any unsaturated fatty acids present. Other methods of raising the melting point of a triglyceride mixture and, hence, its solid phase content at ambient temperature are, however, known. One of these methods is so-called directed interesterification of the triglyeride mixture and is for example described, mainly in relation to plastic shortenings, by Eckey in his U.S. Pat. No. 2,442,532. In essence, the method comprises the addition of a catalyst to the oil mixture to cause random redistribution of the fatty acids, followed by cooling to a temperature at which at least one of the triglycerides present crystallises out of solution. The said triglyceride or triglycerides formed by the random action of the catayst and crystallising out of solution cause the statistical distribution of the interesterification products formed to be upset. Further high melting triglyderide is thus preferentially formed in an attempt to restore the equilibrium and continues to crystallise. Once sufficient of the solid triglyceride has formed to bring the mixture to an overall desired solid phase content the reaction is stopped. Various elaborations to the basic concept are described in the U.S. specification. The all-liquid triglyceride mixture can, for example prior to interesterification, be first slightly cooled to crystallise some of the high melting triglyceride which subsequently acts as seed crystals.

In recent years a demand has existed for margarine oils which are high in polyunsaturated fatty acids (pufa). To retain an overall high degree of unsaturation and yet increase the solid phase content of the oil, the use of directed interesterification in a variety of modified forms has been suggested for margarine oils high in pufa. These various modifications are intended to accelerate the basic process which is described in U.S. Pat. No. 2,442,532 and which can, in some instances, take several days to perform.

UK Patent Specification No. 1,381,721 describes a process for directed interesterification of glyceride esters in which the mixture is alternately subjected, at least three times, to a temperature below the cloud point of a randomised mixture of the triglycerides, followed by a temperature above the cloud point of the mixture. The specification asserts that suitable margarine oil can be prepared from, for example, sunflower oil, after only 24 hours of so-called temperature cycling. European Patent Application No. 79 103419 (Publication No. 0,009,207) describes another directed interesterification process suitable for oils high in pufa in which temperature cycling occurs in a number of closely specified heating and cooling steps.

Although successful in increasing the solid fat content of pufa oils in a relatively short period, the processes described in UK Specification No. 1,381,721 and European Specification No. 9,207 each requires close monitoring and control of the temperature of the mixture with a consequent increase in manufacturing costs and equipment.

We have now discovered a process suitable for the directed interesterification of an oil high in pufa in which temperature cycling is not necessary.

According to the present invention we provide a method for treating an edible oil comprising triglycerides rich in linoleic acid the method comprising directed interesterification characterised by directed interesterifying an oil having a pufa content of at least 60% and a safa (saturated fatty acid) content of between 12.5% and 16% under isothermal conditions.

It is to be understood that the present invention extends to oils treated by the present process and to margarine prepared from the said oils. Throughout the present specification all percentages are by weight and the terms "oil" and "fat" are used interchangeably.

By "isothermal conditions" we mean a temperature which is maintained substantially constant. Slight fluctuations may occur without deviating from the present invention. By means of the present invention, however, we have surprisingly found that an oil can be prepared whose solid phase content can be at least as great as that achieved in either of the temperature cycling methods described above and in a period of time comparable to those employed in UK Specification No. 1,381,721 or European Specification No. 9,207.

The blend of oils used in the present process may consist of one or more naturally occurring oils which if necessary has been refined to remove for example any free fatty acids present. Alternatively, the blend of oils can comprise one or more, preferably naturally occurring, oils having a high pufa content which is refined, if necessary, and then combined with one or more oils having a high safa content. By "high" we mean at least 35wt%, preferably at least 50 wt%, more preferably at least 70 wt%. The oil having a high sufa content can for example be a fully or partially hydrogenated oil and may be a fully or partially hydrogenated sample of the oil having a high pufa content. It may alternatively comprise a hydrogenated fat randomly interesterified with another fat.

In a preferred embodiment of the present process an oil having a high pufa content is mixed with an oil high in safa to produce a blend of oils having the required fatty acid composition. Suitably the blend of oils comprises from 95 to 97% naturally occurring oil having a high pufa content and 5 to 3% oil having a high safa content. A suitable catalyst for random interesterification is then added to the resulting mixture, the catalyst is activated and the temperature of the reaction mixture is selected to bring about directed interesterification and is then maintained substantially constant. Examples of suitable catalysts include sodium ethoxide, potassium ethoxide, sodium methoxide, potassium methoxide and sodium/potassium alloys. The entire reaction may be performed in a single vessel having appropriate means to vary the temperature of the reaction mixture or, alternatively, the catalyst addition and activation may be carried out in a first vessel, the reaction mixture cooled to the desired interesterification temperature by passage through a heat exchanger, for example, a plate heat exchanger and fed to a second vessel where it is maintained at the interesterification temperature. The latter arrangement provides more rapid cooling of the reaction mixture and can in some instances enhance the development of the solid fat phase during the interesterification.

Examples of oils having a high pufa content which have been found to be particularly suitable for use in the present process include sunflower oil and safflower seed oil. A suitable temperature for performing the directed interesterification step with both sunflower oil and safflower seed oil has been found to lie in the range of from about −5° C. to about 12° C., preferably from about 0° C. to 8° C. and is most preferably about 3° C. at which temperature the triglycerides crystallising out of solution comprise substantially a mixture of trisaturated glycerides and mono unsaturated triglycerides. Contrary to some prior art processes, it is not essential that some of the oil high in safa fat is in the solid phase at the activation temperature of the catalyst and/or at the start of the directed interesterification.

By means of the present process it is possible to produce an oil which can be employed in the manufacture of margarine as the sole fatty ingredient in the fatty phase, the oil having a ratio of polyunsaturated fatty acids to saturated fatty acids (p/s ratio) of at least 3.75. Preferably, however, the fat blends are selected within the limits of the present invention to achieve a p/s ratio of at least 4 and more preferably of at least 4.5. Preferably, the blend of oils contains at least 65% pufa and between 12.5 and 15% safa.

Embodiments of the present invention will now be described by way of example only.

EXAMPLE 1

An oil blend comprising a mixture of 584.75 kg refined safflower seed oil and 29.25 kg sunflower seed oil, the sunflower seed oil being fully hardened to a melting point of 69° C. and neutralised, was placed in a reaction vessel having a stirrer and a cooling/heating jacket. The mixture was dried to a water content of $\leq 0.01\%$ by bubbling nitrogen through the oil at a temperature of 70° C. and under a pressure of 200 mb. A catalyst slurry was prepared by mixing 3.9 kg sodium ethylate powder (ex DYNAMITE NOBEL) with 36 kg refined safflower seed oil at ambient temperature with an Ultra Turrax mixer. The slurry was added at the base of the reaction vessel to the oil blend which was at 70° C. The composition of the blend thus became 95.5% safflower seed oil and 4.5% fully hardened sunflower seed oil with the ethylate catalyst present at a level of 0.6 wt%. The oil blend has a pufa content of 73.5%, a safa content of 14.1% and thus a pufa:safa ratio of about 5.2.

The mixture in the reaction vessel was then cooled in 1 hour to 40° C., in two further hours to about 7° C. and in a further two hours to 3° C. at which temperature it was maintained for 90 hours. After the 90 hour period the reaction was stopped by withdrawing 15 l of the blend from the vessel, mixing it with 3 l water to form a water-in-oil emulsion and adding the emulsion to the vessel.

During the interesterification period samples were withdrawn from the vessel at regular intervals to assess the development of the solid phase. The results are given in Table I below in terms of the solid fat content (SFC) at 3° C. and N-values at 10°, 20°, 30° and 35° C. respectively.

TABLE I

| Time of interesterification (h) | SFC (%) 3° | $N_{10}$ | $N_{20}$ | $N_{30}$ | $N_{35}$ |
|---|---|---|---|---|---|
| 0 | 2.9 | 1.2 | 0.8 | 0 | 0 |
| 12 | 9.9 | | | | |
| 24 | 10.8 | 7.5 | 4.2 | 2.1 | 1.3 |
| 36 | 11.9 | | | | |
| 48 | 11.0 | 8.2 | 4.8 | 2.8 | 2.1 |
| 60 | 12.0 | | | | |
| 72 | 12.3 | 9.5 | 5.3 | 3.2 | 1.5 |

TABLE I-continued

The results given in Table I show that a major proportion of the triglycerides which are produced by the interesterification and which are solid at 3° C. have formed within 24 hours.

The product obtained after the whole 90 hour period was removed from the vessel and subjected to washing, drying, bleaching, filtering and deodorisation steps. The resulting oil was stored at 60° C. under nitrogen.

Margarine was prepared from the stored oil according to conventional techniques. In a continuous process a premix was formed containing 82.35% of the oil, 6.9% water, 10.0% bacteriologically soured milk and vitamin, colouring and preservative additives and was fed through two scraped surface heat exchangers arranged in series and a crystallising unit and was then packaged. The premix temperature was 50° C. The emulsion exited from the first scraped surface heat exchanger at 10.1° C., from the second scraped surface heat exchanger at 5.7° C. and from the crystallising unit at 7.1° C. The margarine had the following N values:

$N_{10}$ 9.6, $N_{20}$ 5.8, $N_{30}$ 3.0, $N_{40}$ 1.9 and a melting point of 36° C.

EXAMPLE 2

The procedure of Example 1 was repeated employing refined sunflower seed oil in place of the safflower seed oil in both the oil blend and the catalyst slurry. The proportion of oil used and the method of preparation of the catalyst slurry was in each case the same. In the final reaction mixture the blend had a pufa content of 67.7%, a safa content of 15.8% and pufa:safa ratio of about 4.3.

After the catalyst slurry has been added to the reaction vessel the mixture was cooled to 40° C. in 1 hour, to about 7° C. in two further hours and to 3° C. in a further two hours. The mixture was maintained at 3° C. for 60 h after which the reaction was stopped and the oil refined in the manner described in Example 1.

The development of solid fat during the reaction was followed as in Example 1. The results are given in Table II.

TABLE II

| Reaction Time (h) | $SFC_3$ | $N_{10}$ | $N_{20}$ | $N_{30}$ | $N_{35}$ |
|---|---|---|---|---|---|
| 0 | | | | | |
| 12 | 10.7 | | | | |
| 24 | 13.6 | 10.7 | 6.6 | 3.5 | 3.2 |
| 36 | 14.3 | | | | |
| 48 | 14.5 | 11.6 | 7.2 | 4.0 | 3.2 |
| 60 | | | 7.9 | | |

As in Example 1 a major proportion of triglycerides solid at 3° C. had formed within 24 hours.

A margarine was prepared from the present oil employing the procedure and proportions described in Example 1. In the present case the premix had a temperature of 50° C., the emulsion exiting the first scraped surface heat exchanger a temperature of 22° C., on exiting from the second surface heat exchanger a temperature of 8.9° C. and on leaving the crystallising unit for packaging a temperature of 10.4° C. The N values of the margarine were N10 12.4, N20 7.6, N30 4.7, N40 3.0 and a melting point of 39° C.

EXAMPLE 3

In the present example the single source of sunflower oil employed has a safa content of 11% and a pufa content of 64%. A portion of the sunflower oil was firstly fully hardened to a melting point of 69° C. 30 parts of the fully hydrogenated sunflower oil were then randomly interesterified with 70 parts of non-hydrogenated sunflower oil taken from the same source. The resulting triglyceride blend was employed as the oil having a high safa content and was directed interesterified with more sunflower oil, again from the same source, as the oil high in pufa in a ratio of high safa oil:high pufa oil of 12:88. The catalyst used was a 50:50 sodium:potassium alloy present at a level of 0.25% based on the fat mixture. The interesterification was performed at 3° C. After 24 hours, further interesterification was stopped by the addition of an acid. The resulting fat blend was then removed from the reaction mixture, washed and dried.

A comparative process was carried out under identical conditions but in the absence of any added oil high in safa.

On analysis, the solid fat content of the oil prepared by a process embodying the present invention was found over a wide temperature range to be nearly twice that of the oil prepared by the above comparative process.

The relevant figures are given in Table III below.

TABLE III

| | Directed interesterified 88% unhardened sunflower oil + 12% oil high safa | Directed interesterified 100% unhardened sunflower oil |
|---|---|---|
| N10 | 11.7 | 6.2 |
| N20 | 7.6 | 3.9 |
| N30 | 5.1 | 2.3 |
| N35 | 3.4 | 1.8 |

The oil produced in Example 3 was found to have a solid phase content and the margarine produced from the oil hardness values better than those of oils of identical fatty acid compositions, which has undergone the temperature cycling methods described in UK Specification No. 1,381,721 and European Specification No. 9,207 and margarines produced therefrom respectfully. The solid phase values of the margarine oils formed by the three respective processes and the hardness values of the margarines prepared therefrom are given in Table IV below. The two temperature cycling methods were each performed for 24 hours and employed a catalyst at a level of 0.25%. The temperature cycling conditions followed the requirements of UK Specification No. 1,381,721 and Example V of European Specification No. 9,207 respectively.

TABLE IV

| | | UK 1 381 721 | EU 9 207 | Present Example 3 |
|---|---|---|---|---|
| Solid phase | N10 | 9.9 | 7.6 | 11.7 |
| | N20 | 6.7 | 4.9 | 7.6 |
| | N30 | 4.5 | 3.3 | 5.1 |
| | N35 | 3.5 | 2.2 | 3.4 |
| Hardness | C5 | 435 | 365 | 595 |
| | C10 | 410 | 260 | 460 |

TABLE IV-continued

| | UK 1 381 721 | EU 9 207 | Present Example 3 |
|---|---|---|---|
| C15 | 285 | 210 | 375 |
| C20 | 110 | 70 | 100 |

The margarine oil of the Example 3 had a p/s ratio of 4.3 to 4.4 and was used to prepare margarine by emulsification with an aqueous phase. No additional fat need be added.

EXAMPLE 4

A source of safflower seed oil having a pufa content of 76.2% and a safa content of 10.6%, and a portion of fully hardened sunflower seed oil were the triglyceride ingredients employed in the present Example.

A suspension of 10% sodium ethoxide in safflower seed oil was prepared and maintained at room temperature for 4 hours. The suspension was then added to a blend of triglycerides comprising 95.4% safflower seed oil and 4.6% fully hardened sunflower oil in a proportion of 6.0% suspension to 94% triglyceride blend. The level of the sodium ethoxide catalyst in the resulting mixture was therefore 0.6%. The catalyst was activated by raising the temperature of the mixture to 70° C. The temperature of the mixture was then lowered to 3° C. and maintained substantially constant for 40 hours during which time directed interesterification took place. At the end of this time the reaction was halted, the fat blend formed removed from the reaction mixture, washed and dried. The solid phase content of the fat blend produced is given in Table V.

TABLE V

| | Sample directed interesterified for 40 hours |
|---|---|
| N10 | 8.7 |
| N20 | 5.0 |

The p/s ratio of the sample was about 5.1 to 5.2. From the sample a margarine could be prepared by emulsification with an aqueous phase and without the addition of any further fat.

EXAMPLE 5

An apparatus was employed in the present example which included two scraped vessels, each having a capacity of 200 l. A tubular linkage leads from the base of the first vessel to the top of the second vessel and includes in its path a plate heat exchanger. Gas, oil and slurry inputs are arranged leading into the first vessel which also includes a vent release. The second vessel includes outlets by which to sample the reaction mixture and a main outlet by which oil is transferred from the vessel.

In use 188.5 kg oil is charged to the first vessel and dried at a temperature of 70° C. by blowing nitrogen gas at a pressure of about 100 mb through it until a moisture content of not more than 0.01 wt% is achieved. 0.8% sodium ethoxide, based on the weight of the oil, was then sucked into the first vessel. The vacuum was broken by nitrogen blanketing and the mixture cooled to 40° C. in about 30 minutes. The mixture was then pumped through the plate heat exchanger in about 30 minutes and so transferred to the second vessel. The coolant in the plate heat exchanger is arranged to cool the oil mixture to the desired reaction temperature.

The mixture is retained in the second vessel at the desired reaction temperature for 24 hours or longer. Interesterification is then halted by withdrawing 5 l reaction mixture from the vessel, emulsifying the 5 l reaction mixture with 1 l water and returning the emulsion by suction to the second vessel. The mixture is then heated to 50° C. and is ready for transfer for further refining.

Further refining steps include washing the oil soap free with a 5% aqueous solution of $H_3PO_4$ and then several washes with water.

Employing the above apparatus and procedure three batches of oil were directed interesterified under isothermal conditions at −3° C., +3° C. and +8° C. respectively. In each case the batch consisted of a blend of sunflower oil hydrogenated to a melting point of 69° C. and safflower oil in a ratio of sunflower oil:safflower oil of 4.5:95.5. The pufa content of the blend was 73.1 wt% and the safa content 14.1 wt%. In each case samples of the reaction mixture were withdrawn from the second vessel as the reaction proceeded. Tables VI to VIII below give solid fat content (SFC) and N values for each batch of oil as a function of temperature and of reaction time.

TABLE VI

| | Oil interesterified −3° C. | | | | |
|---|---|---|---|---|---|
| Time (h) | $SFC_{-3°C.}$ (%) | $N_{10}$ | $N_{20}$ | $N_{30}$ | $N_{35}$ |
| 0 | 3.4 | — | 0.4 | — | — |
| 12 | 9.7 | — | 2.5 | — | — |
| 24 | 14.9 | 6.6 | 3.5 | — | — |
| 48 | 10.7 | — | — | — | — |
| 72 | 12.4 | 7.2 | 4.6 | 2.0 | 0.2 |

TABLE VII

| | Oil interesterified at +3° C. | | | | |
|---|---|---|---|---|---|
| Time (h) | $SFC_{+3°C.}$ (%) | $N_{10}$ | $N_{20}$ | $N_{30}$ | $N_{35}$ |
| 0 | 2.2 | — | 0.7 | — | — |
| 12 | 10.5 | — | — | — | — |
| 24 | 11.5 | 9.1 | 5.9 | 3.6 | 2.6 |
| 36 | 12.4 | — | — | — | — |
| 48 | 13.0 | 10.6 | 6.9 | 4.7 | 2.2 |
| 60 | 12.4 | — | — | — | — |
| 72 | 13.6 | 11.1 | 7.2 | 4.7 | 2.6 |

TABLE VIII

| | Oil interesterified at +8° C. | | | | |
|---|---|---|---|---|---|
| Time (h) | $SFC_{+8°C.}$ (%) | $N_{10}$ | $N_{20}$ | $N_{30}$ | $N_{35}$ |
| 0 | 1.0 | 0 | 0 | 0 | 0 |
| 24 | 7.4 | 7.2 | 5.2 | 3.2 | 1.7 |
| 48 | 7.7 | 7.8 | 5.7 | 3.8 | 2.8 |
| 72 | 11.3 | 8.4 | 6.2 | 4.1 | 3.2 |

In each case the final interesterified and washed product was suitable for use as a margarine oil. Moreover the oils interesterified at +3° C. and +8° C. respectively had a sufficient solid fats content after only 24 hours interesterification to be suitable for use as a margarine oil.

EXAMPLE 6

The procedures described in Examples 1 and 5 above respectively were compared. Two batches of 188.5 kg oil blend comprising 95.5wt% safflower seed oil and 4.5wt% fully hardened (69° C.) sunflower seed oil were interesterified according to the two respective methods. In each case sodium ethoxide was employed as the catalyst at a level of 0.6 wt% and the interesterification temperature was +3° C. After 24 hours the two reactions were stopped and the N values of the resulting products were measured. The results are given in Table IX.

TABLE IX

| Procedure | $N_{10}$ | $N_{20}$ | $N_{30}$ | $N_{35}$ |
|---|---|---|---|---|
| Acc. Ex 1 | 7.0 | 3.8 | 2.2 | 1.1 |
| Acc. Ex 5 | 9.1 | 5.9 | 3.6 | 2.6 |

The more rapid development of a solid fat phase employing the procedure according to Example 5 can be seen from Table IX.

Although capable of storage for a limited period of time the margarine oils of the present invention are preferably used to prepare margarine immediately after the directed interesterification procedure has been completed. If storage of the oils is required storage takes place at −27° C. and preferably at under a nitrogen atmosphere. Margarines once prepared from the present oils are preferably stored under refrigeration.

We claim:

1. Method for treating an edible oil comprising triglycerides rich in linoleic acid the method consisting essentially of directed interesterifying an oil having a polyunsaturated fatty acid content of at least 60% and a saturated fatty acid content of between 12.5% and 16%, at least a part of the saturated fatty acid content comprising hydrogenated fatty acids, under isothermal conditions, the resultant oil being suitable for use in margarine manufacture absent temperature cycling treatment.

2. Method according to claim 1 wherein the oil is directed interesterified at a temperature within the range of from about −5° C. to about 12° C.

3. Method according to claim 2 wherein the oil is directed interesterified at a temperature within the range of from about 0° C. to about 8° C.

4. Method according to claim 1 wherein the oil is subjected to directed interesterification for less than 24 hours.

5. Method according to claim 1 wherein the oil has a pufa content of at least 65%.

6. Method according to claim 1 wherein the oil has a safa content of between 12.5% and 15%.

7. Method according to claim 1 wherein the oil comprises a blend of at least one oil having a high pufa content and at least one oil having a high safa content.

8. Method according to claim 7 wherein the oil having a high safa content comprises a fully or partially hydrogenated oil.

9. Method according to claim 7 wherein the oil having a high safa content comprises a fully or partially hydrogenated oil randomly interesterified with another oil.

10. Method according to claim 8 wherein the said fully or partially hydrogenated oil comprises fully or partially hydrogenated sunflower oil and/or safflower seed oil.

11. Method according to claim 7 wherein the oil having a high pufa content is selected from sunflower oil, safflower seed oil and a mixture thereof.

12. Method according to claim 7 wherein the oil comprises 95 to 97% oil having a high pufa content and 5 to 3% oil having a high safa content.

13. Method according to any one of the preceding claims wherein the oil is a margarine oil.

14. Oil prepared by a method according to claim 1 having a pufa:safa ratio of at least 3.75.

15. Margarine containing an oil according to claim 14.

* * * * *